(12) United States Patent
Handke et al.

(10) Patent No.: US 8,336,686 B2
(45) Date of Patent: Dec. 25, 2012

(54) MOUNT FOR A VIBRATION DAMPER (75) Inventors: Günther Handke, Euerbach (DE); Markus Schulz, Remscheid (DE)

(73) Assignees: Ford-Werke GmbH, Koeln (DE); ZF Friedrichshafen AG, Friedrichshafen (DE)

( * ) Notice: Subject to any disclaimer, the term of this patent is extended or adjusted under 35 U.S.C. 154(b) by 1618 days.

(21) Appl. No.: 11/205,955

(22) Filed: Aug. 17, 2005

(65) Prior Publication Data
US 2006/0054436 A1    Mar. 16, 2006

(30) Foreign Application Priority Data

Aug. 17, 2004    (DE) .................. 10 2004 039 734

(51) Int. Cl.
*F16F 9/00*    (2006.01)
(52) U.S. Cl. .............. 188/321.11; 188/297; 267/220
(58) Field of Classification Search ........... 188/321.11, 188/297; 267/220; 403/11–13, 329
See application file for complete search history.

(56) References Cited

U.S. PATENT DOCUMENTS

| | | | | |
|---|---|---|---|---|
| 4,260,176 A | * | 4/1981 | Pacis et al. ............. | 280/124.155 |
| 4,729,458 A | * | 3/1988 | Bauer et al. ............. | 188/129 |
| 4,958,849 A | | 9/1990 | Pinch et al. | |
| 5,326,082 A | * | 7/1994 | Ecktman et al. .......... | 267/64.27 |
| 5,342,139 A | * | 8/1994 | Hoffman ................. | 403/327 |
| 6,038,756 A | * | 3/2000 | Banks .................... | 29/453 |
| 6,155,543 A | * | 12/2000 | Solomond et al. .......... | 267/216 |
| 6,260,835 B1 | * | 7/2001 | Angles et al. ............ | 267/220 |
| 6,572,089 B2 | * | 6/2003 | Zietsch .................. | 267/220 |
| 7,066,456 B2 | * | 6/2006 | Hodumi .................. | 267/220 |
| 2002/0175034 A1 | * | 11/2002 | Sander et al. ............ | 188/297 |
| 2006/0272911 A1 | * | 12/2006 | Feldmann ................ | 267/220 |

FOREIGN PATENT DOCUMENTS

| | | |
|---|---|---|
| DE | 27 16 099 | 1/1988 |
| DE | 100 18 058 | 10/2001 |
| EP | 602330 A1 * | 6/1994 |
| JP | 63226916 | 5/1988 |
| JP | 02204113 | 8/1990 |
| JP | 2002019440 | 1/2002 |

OTHER PUBLICATIONS

Examination Report for the corresponding German application dated Nov. 3, 2005.
Search Report issued for corresponding European Application No. EP 05 01 7253, Oct. 19, 2005.

* cited by examiner

*Primary Examiner* — Robert A Siconolfi
*Assistant Examiner* — James Hsiao
(74) *Attorney, Agent, or Firm* — Cozen O'Connor (57) ABSTRACT

A mount for supporting a vibration damper in a vehicle has a cap provided with an anti-twist surface and configured to extend through a recessed support surface of the vehicle. The mount is provided with a retainer operable to couple the anti-twist surface to the support surface so as to suspend the vibration damper on the vehicle before and independently from fastening the vibration damper to the vehicle.

13 Claims, 9 Drawing Sheets

MOUNT FOR A VIBRATION DAMPER

BACKGROUND OF THE INVENTION

1. Field of the Invention

The invention pertains to a mount for a vibration damper.

2. Description of the Related Art

U.S. Pat. No. 6,572,089, which defines the state of the art, describes a mount for a vibration damper comprising at least one anti-twist surface, which is in working connection with an opposing surface on the vehicle side at least during the course of the installation of the vibration damper in a receiving opening in the vehicle, where the minimum of one anti-twist surface and the opposing surface align connecting means on the mount side rotationally with connecting means on the vehicle side, where the mount has a bearing cap with the minimum of one anti-twist surface configured to prevent relative rotation of the vibration damper and the bearing cap, and where the bearing cap is in working, torque-transmitting connection with the overall mount.

The great advantage of a bearing cap of this type is that the vibration damper can be introduced into the installation site with considerable accuracy in terms of its orientation in the circumferential direction when it is being installed. The bearing cap takes over positioning the vibration damper exactly in accordance with the desired position. The advantage of the cap is even more evident when repairs must be made in a garage. No assembly robots are available here; instead, the mechanic must find the correct position based on his experience.

If there is enough room available in the vehicle, the installation aid can also be used as a cover for the piston rod.

When the vibration damper is introduced by the installer or by a device into the wheel housing, the fastening screws must be installed immediately between the mount and the vehicle body. During the assembly of the vehicle, the problem occurs that the vibration damper must be introduced upward from the bottom of the vehicle, but at the same time the installer must install the fastening means, usually threaded nuts, from above. This sequence of operations may not translate into an efficient process.

In cases where the vibration damper must be installed by hand as part of a repair assignment, it is necessary under certain conditions for the installer to introduce the vibration damper into the wheel housing and to hold it there, while a second installer then installs the fastening means.

The object of the present invention is to realize a mount for a vibration damper which minimizes the problem of the installation work known from the state of the art.

SUMMARY OF THE INVENTION

The task is accomplished according to the invention in that the mount has retaining means, which work independently of the connecting means to prevent the vibration damper from falling out of the vehicle during its installation.

The great advantage is that the vibration damper can now be brought into an intermediate installation position in which it cannot fall out before the connecting means for permanently mounting the vibration damper to a vehicle. Thus an installer can install the vibration damper by himself without any special auxiliary devices. Under conditions of mass production, the intermediate assembly position can be used to create a gap in time between the installation of the vibration damper and the installation of the connecting means. As long as work is being performed on the underside of the vehicle, for example, the vibration dampers can be left to hang in their intermediate position. The connecting means can be installed later, when work starts on the engine compartment or trunk and the assembly line is moving at a lower working level. This results in a more efficient assembly line overall.

It is provided that the retaining means are formed by retaining surfaces, which are supported on the vehicle side.

The retaining means are provided by at least one elastic tongue, which is guided during the installation process through a receiving opening on the vehicle side and which can then relax in the radial direction after installation. In general, the retaining means can also work nonpositively, but positive-acting retaining means offer the advantage that they are less sensitive to dirt during the assembly operations.

In a first solution variant, the retaining means are formed by the bearing cap, and the bearing cap is fastened to the vibration damper in alignment with the longitudinal axis of the damper.

The bearing cap is fastened to the vibration damper by at least one positive connection. Thus the bearing cap locks the vibration damper to the vehicle.

In another design variant, the positive connection is formed by at least one snap hook, which engages in a carrier of the mount on the vibration damper side.

To achieve greater freedom with respect to the design of the components in question, the positive connection is designed to function independently of the anti-twist function of the bearing cap for the vibration damper-side mount.

According to an advantageous embodiment, the minimum of one elastic tongue is located in the area of the anti-twist surface.

It is necessary in many cases for the vibration damper to be installed with a specific orientation in the circumferential direction. For this reason, it is provided that the bearing cap has a maximum of one axis of symmetry with respect to the arrangement of the anti-twist surfaces.

For this purpose, the main axes of the bearing cap are of different lengths.

In another advantageous embodiment, the carrier of the mount on the vibration damper side is provided with a cranked section, which accommodates the height of the snap hook.

The mount on the vehicle side can have a cup-shaped receptacle for the cranked section of the bearing on the vibration damper side, so that, in the intermediate installation position, transverse loads can be positively absorbed independently of the retaining means by the cranked section in conjunction with the cup-shaped receptacle.

It is also possible for the carrier of the mount on the vibration damper side to carry he retaining means which work with the vehicle. This solution has the advantage of simplifying the design of the bearing cap.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
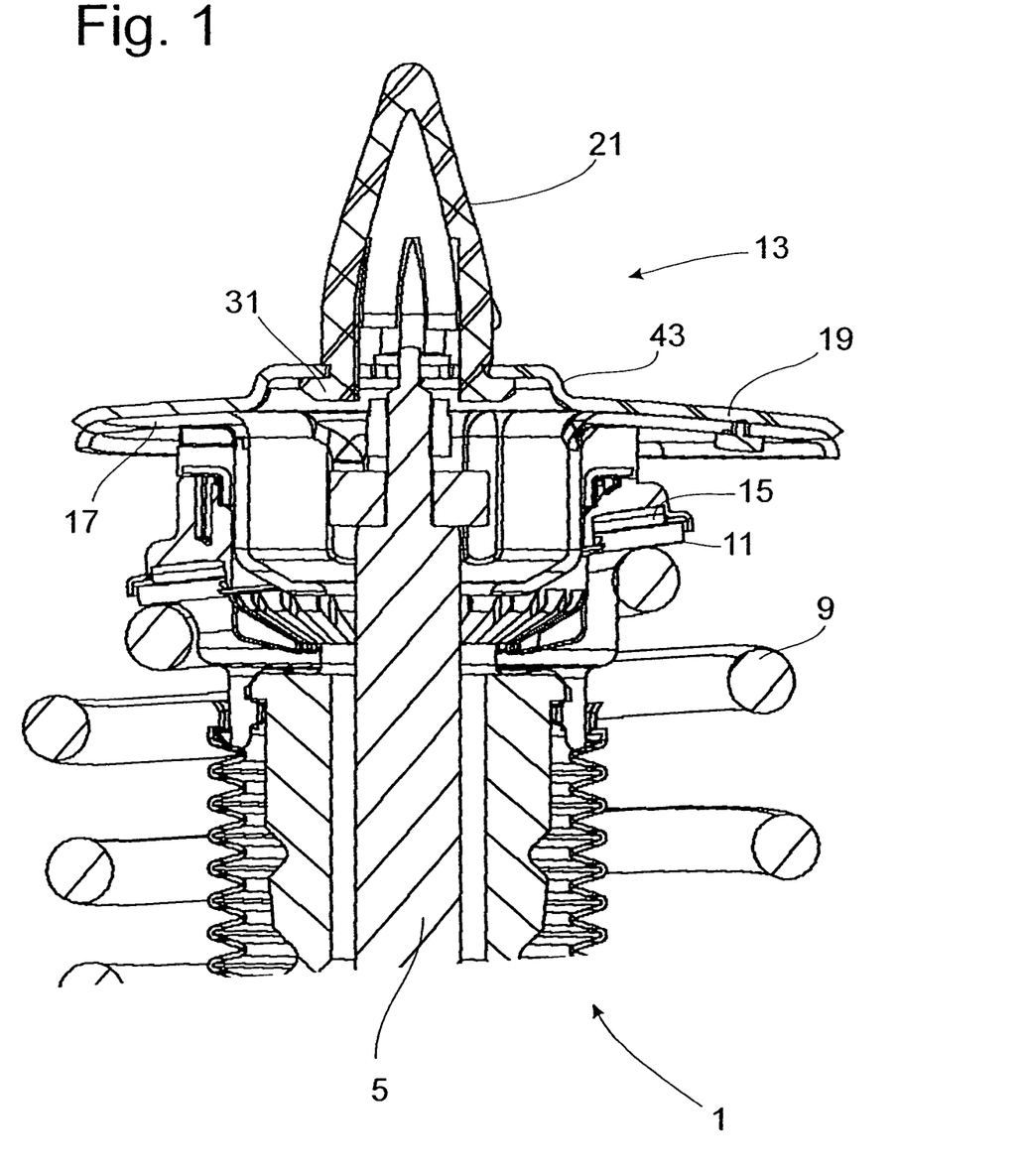
FIGS. 1 and 2 show the mount on the vibration damper side.
Figure 2:
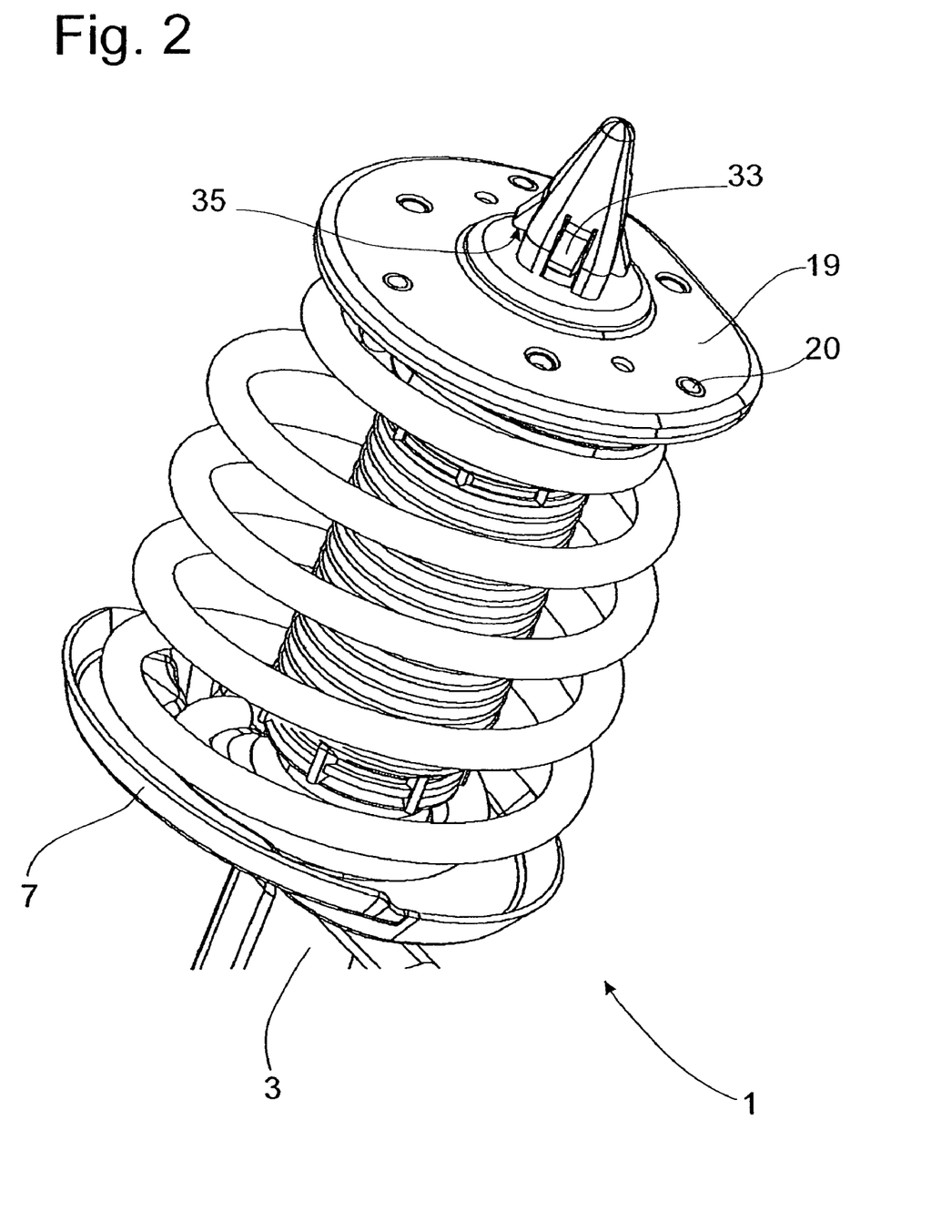

FIGS. 1 and 2 show a section of a vibration damper 1 in the form of a MacPherson strut unit. The vibration damper comprises a cylinder 3 (FIG. 2), in which a piston rod 5 (FIG. 1) moves axially back and forth. The operation of a vibration damper is well known and needs not to be disclosed in detail. A spring collar 7 (FIG. 2) for a vehicle suspension spring 9 (FIG. 1) is attached to the cylinder. The suspension spring is supported against a second spring collar 11. The second spring collar is a component of a mount 13, which is attached to a vehicle (not shown). The mount has an inclined plain bearing or roller bearing 15, which is supported on a base body 17. The base body and a carrier 19 enclose an elastomeric element, which is in turn in working connection with the piston rod 5. All of the forces acting on the vibration damper 1 are transmitted by the carrier 19 to the vehicle. The carrier 19 has a number of connecting means 20, which are designed as through-openings, for example, or as threaded pins.

A bearing cap 21 is positively connected to the carrier 19. If there is enough room in the vehicle, it can be used as a cover for the upper end of the piston rod.

The bearing cap 21 shown as a separate part in the FIGS. 3a-3d has the contour of a truncated cone proceeding from a diamond-shaped base surface 23, the lateral surface of the cap being designed with anti-twist surfaces 25. In this exemplary embodiment, the bearing cap has two axes of symmetry 26, 28, the main axis 26 being longer than the main axis 28. As a result, the bearing cap can occupy only two installation positions 180° apart. It is also possible to use a kite-shaped base surface with no more than one axis of symmetry; in this case, the bearing cap 21 can occupy only a single installation position, as illustrated in broken line in FIG. 3b. At least two pins 27 are provided as anti-twist locks on the base surface 23; these pins fit into two openings 29 (see FIG. 4). In addition, at least two snap hooks 31, which form a positive connection with the carrier 19 of the vibration damper 1, also extend axially from the base surface 23. The snap hooks 31 are separated in space from the pins 27, so that it is easier to provide the snap hooks with greater radial elasticity.

Figure 3A:
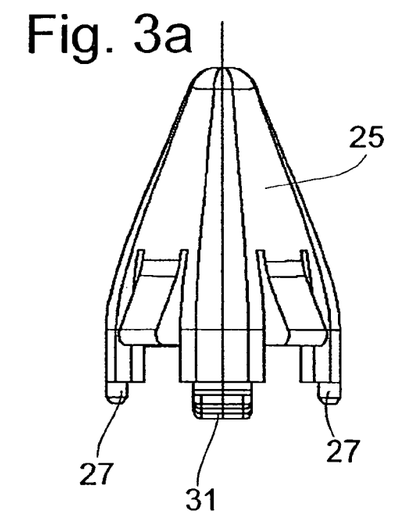
FIGS. 3*a*-3*d* show the bearing cap as a separate part.
Figure 3B:
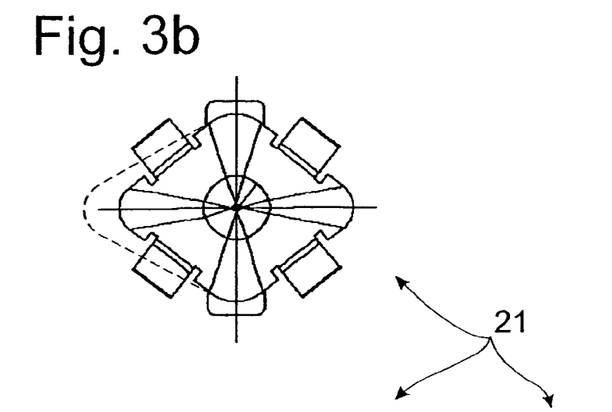
Figure 3C:
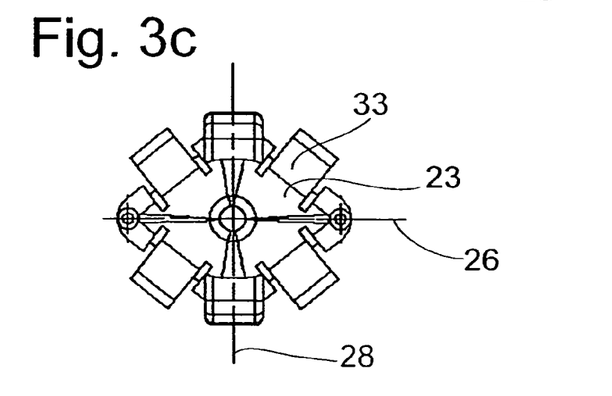
Figure 3D:
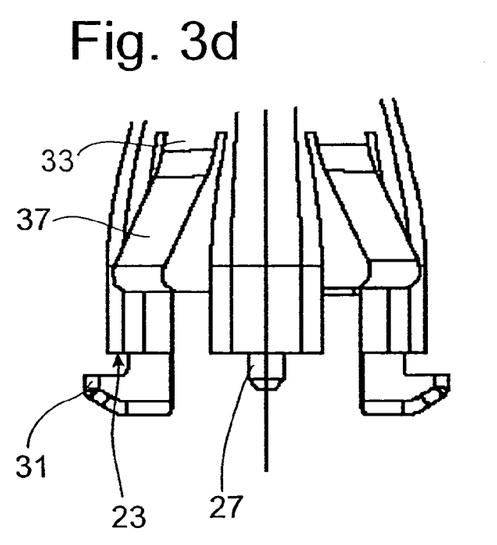
Figure 4:
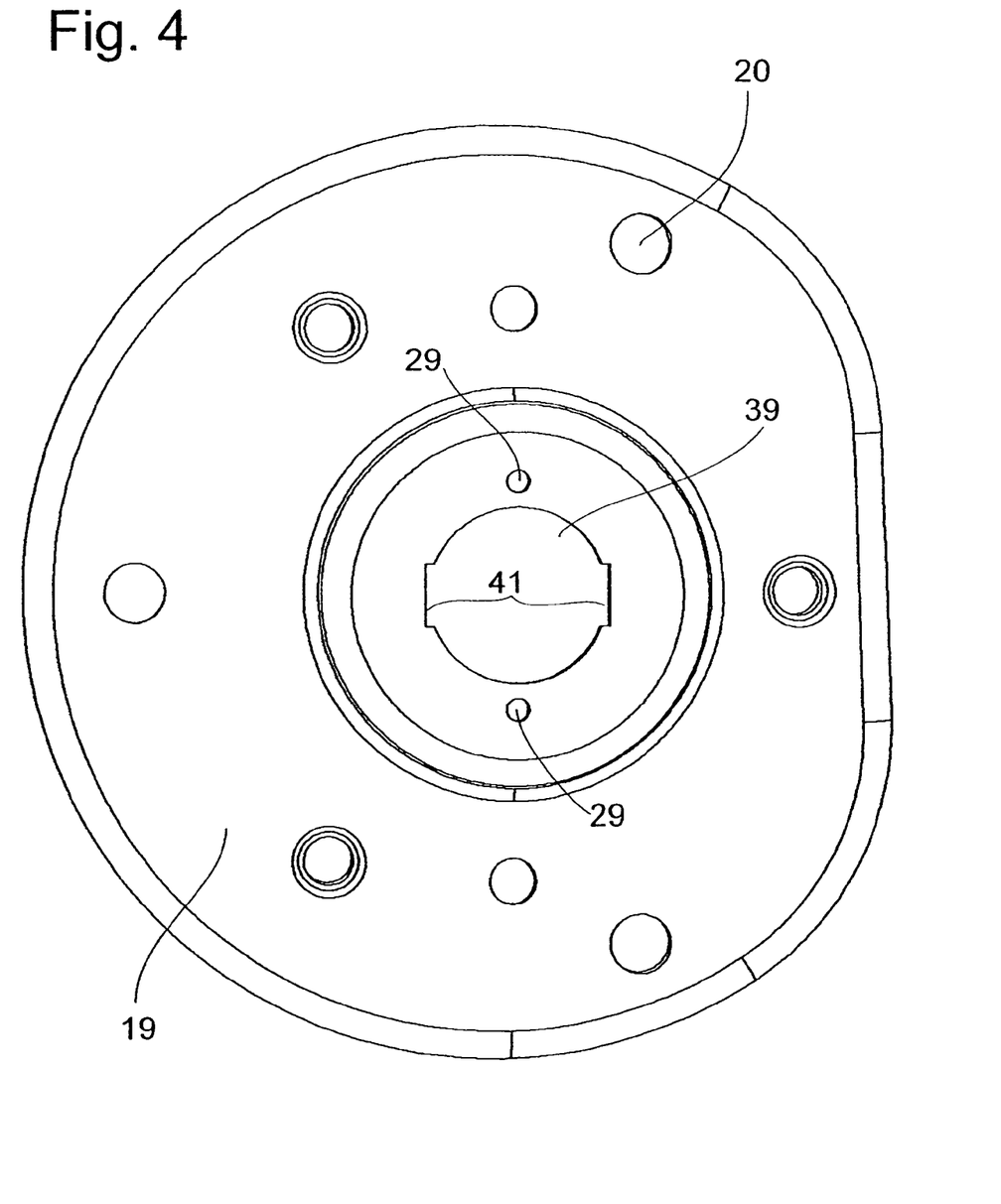
FIG. 4 shows a plan view of the mount on the vibration damper side without the cap.

FIGS. 3a and 3d show the radially elastic tongues 33, which are separated from each other radially by longitudinal cuts in the areas of the anti-twist surfaces 25. The tongues represent retaining means with retaining surfaces 35 (FIG. 2), which are a defined axial distance from the base surface 23. A taper 37 (FIG. 3d) is formed on the top surface of the tongue.

When the mount 13 is installed, the base surface 23 of the bearing cap 21 is pressed down onto the carrier 19. The carrier has a through-opening 39 to receive the end of the piston rod, which is covered by the bearing cap. In the through-opening, recesses 41 can be provided, which make it easier to introduce the snap hooks 31 (see FIG. 4). It can be seen in FIG. 1 that, when the bearing cap 21 is installed, the snap hooks 31 grip under the carrier 19. The carrier 19 is provided with a cranked section 43 (FIG. 6) which is formed as a raised ridge shaped and dimensioned to accommodate the height of the snap hooks 31. FIG. 2 is intended to show that the retaining surfaces 35 on the bottom of the tongues 33 do not rest on the top surface of the carrier 19.

Figure 5:
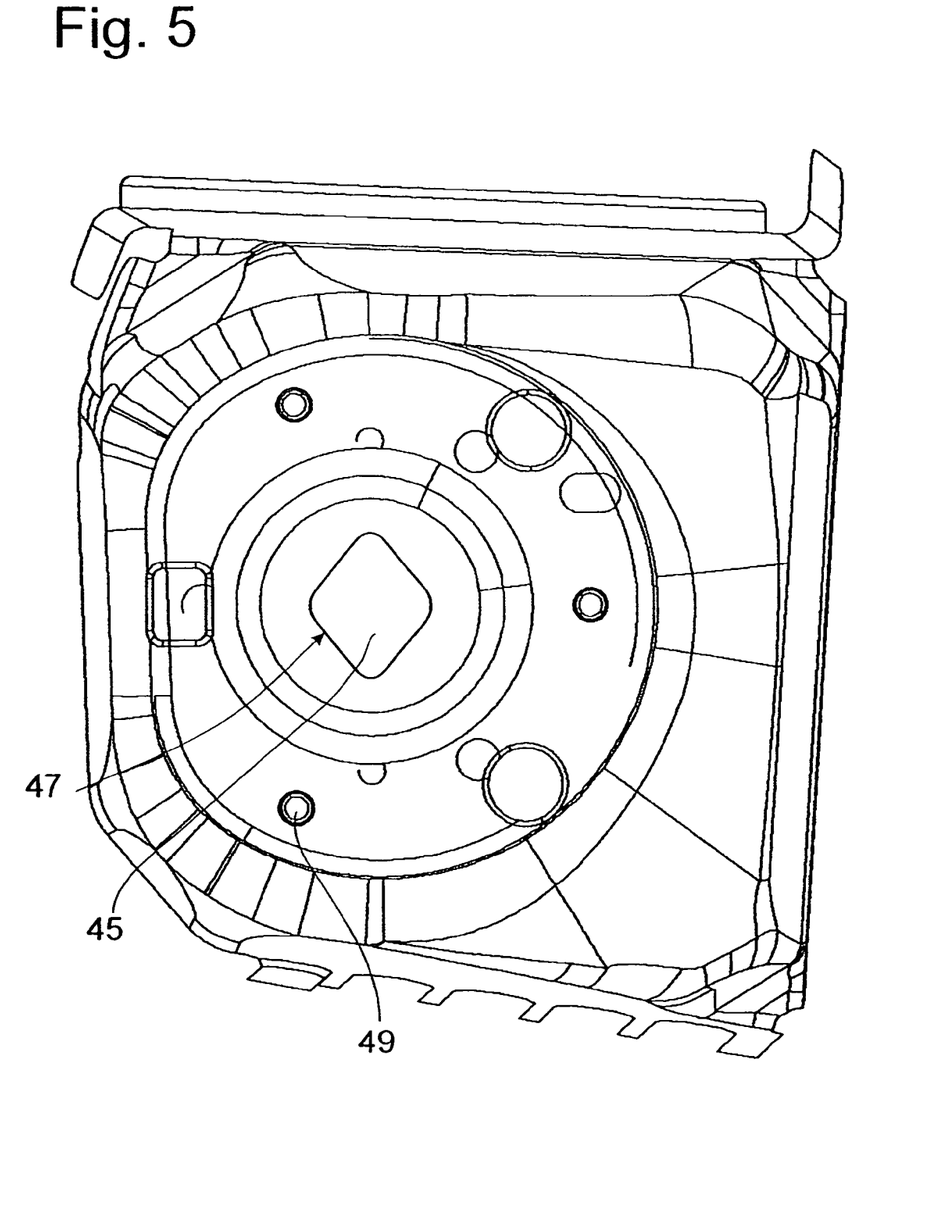
FIG. 5 shows a plan view of part of a vehicle in the area of the mount.

FIG. 5 is limited to a view of part of the vehicle in the area of the mount. The vehicle has a receiving opening 45, the cross section of which is adapted to the shape of the base surface 23 of the bearing cap 21. The lateral edges of the receiving opening 45 represent opposing surfaces 47, which cooperate with the anti-twist surfaces 25 of the bearing cap 21. In the vehicle there are also connecting means, preferably openings 49, which can be brought in only one angular position into alignment with the connecting means 20 in the carrier 19.

When the vibration damper with its mount 13 is installed from underneath in the vehicle, the bearing cap passes through the receiving opening 45. As this takes place, the anti-twist surfaces 25 and the opposing surfaces 47 on the vehicle make contact with each other and align the mount 13 rotationally. Their respective connecting means 20, 49 also become aligned with each other at the same time. The tapers 37 (FIG. 3d) ensure that the radially elastic tongues 33 of the bearing cap 21 are pushed inward.

Figure 6:
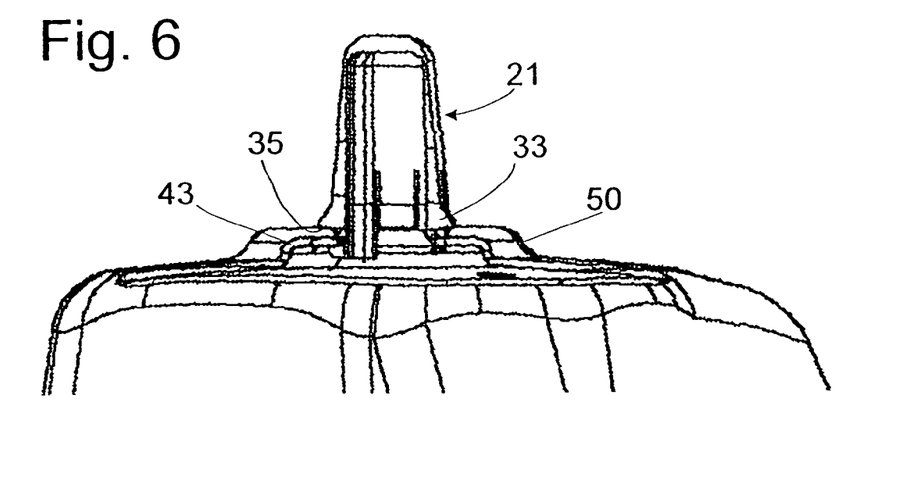
FIG. 6 shows a cross section through the mount.
Figure 7:
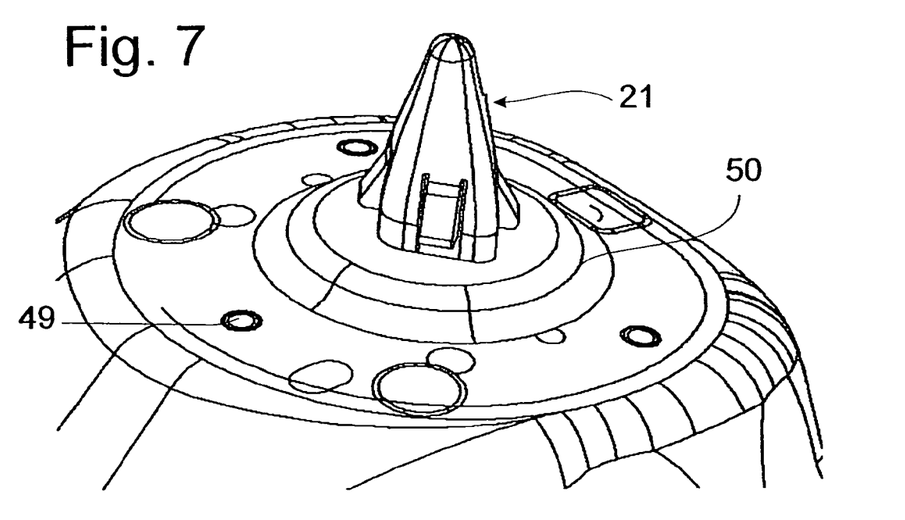
FIG. 7 shows a perspective view of the mount shown in FIG. 6.
Figure 8:
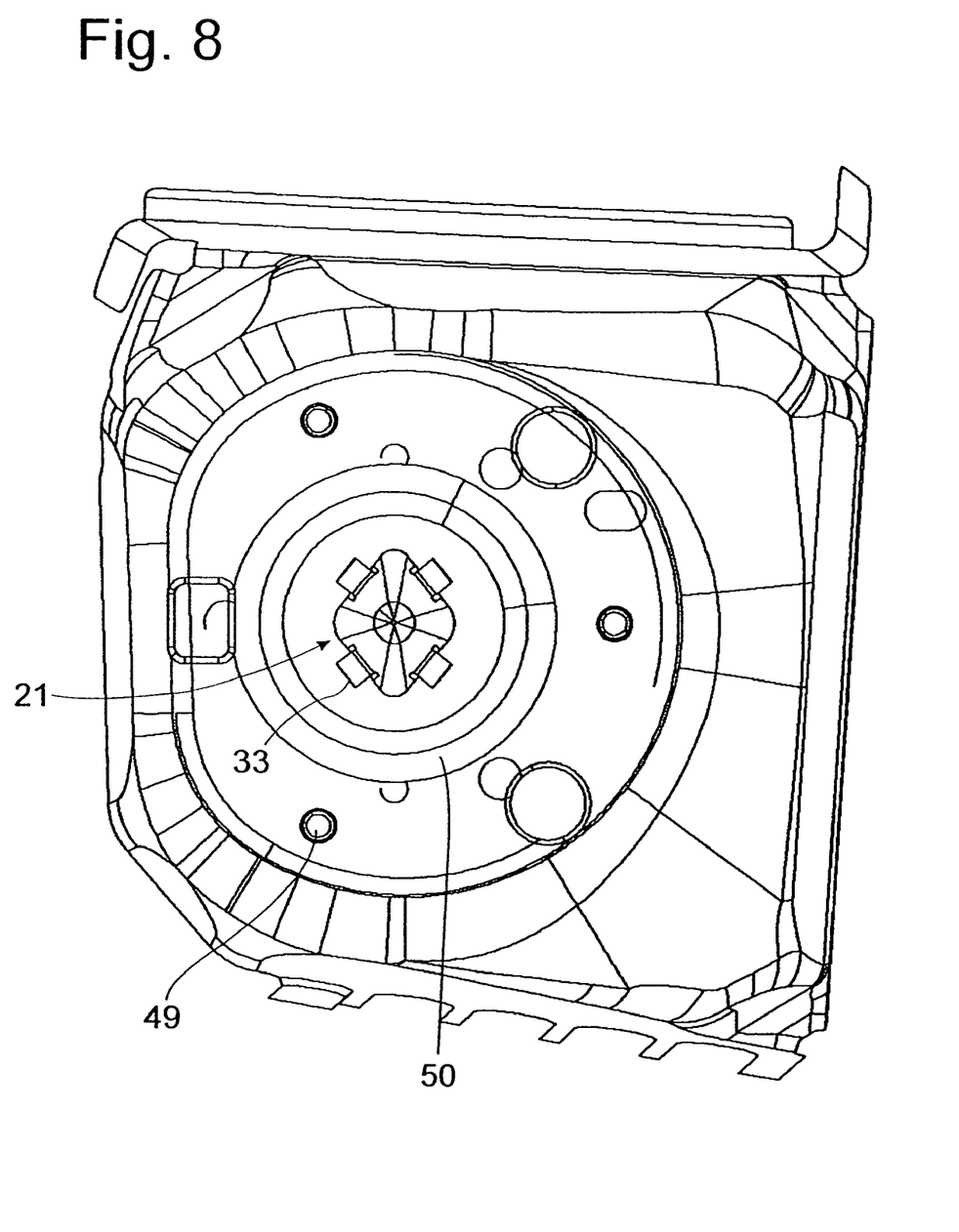
FIG. 8 shows a plan view of the mount according to FIG. 6.

In an intermediate installation position, the tongues can relax radially, and the retaining surfaces 35 of the tongues 33 now come to rest on the top surface of the vehicle (FIGS. 6-8). Thus the snap hooks 31 and the tongues 33 of the bearing cap 21 lock the vibration damper 1 to the vehicle therebetween, as shown in FIG. 8. Even though the connecting means are not yet installed, the vibration damper cannot fall back down out of the vehicle. The mount on the vehicle side has a cup-shaped receptacle 50 (FIG. 7) for the cranked section 43 (FIG. 6) of the mount 13 on the vibration damper or inner side. Thus relatively large transverse forces can be absorbed even in the intermediate assembly position.

Figure 9:
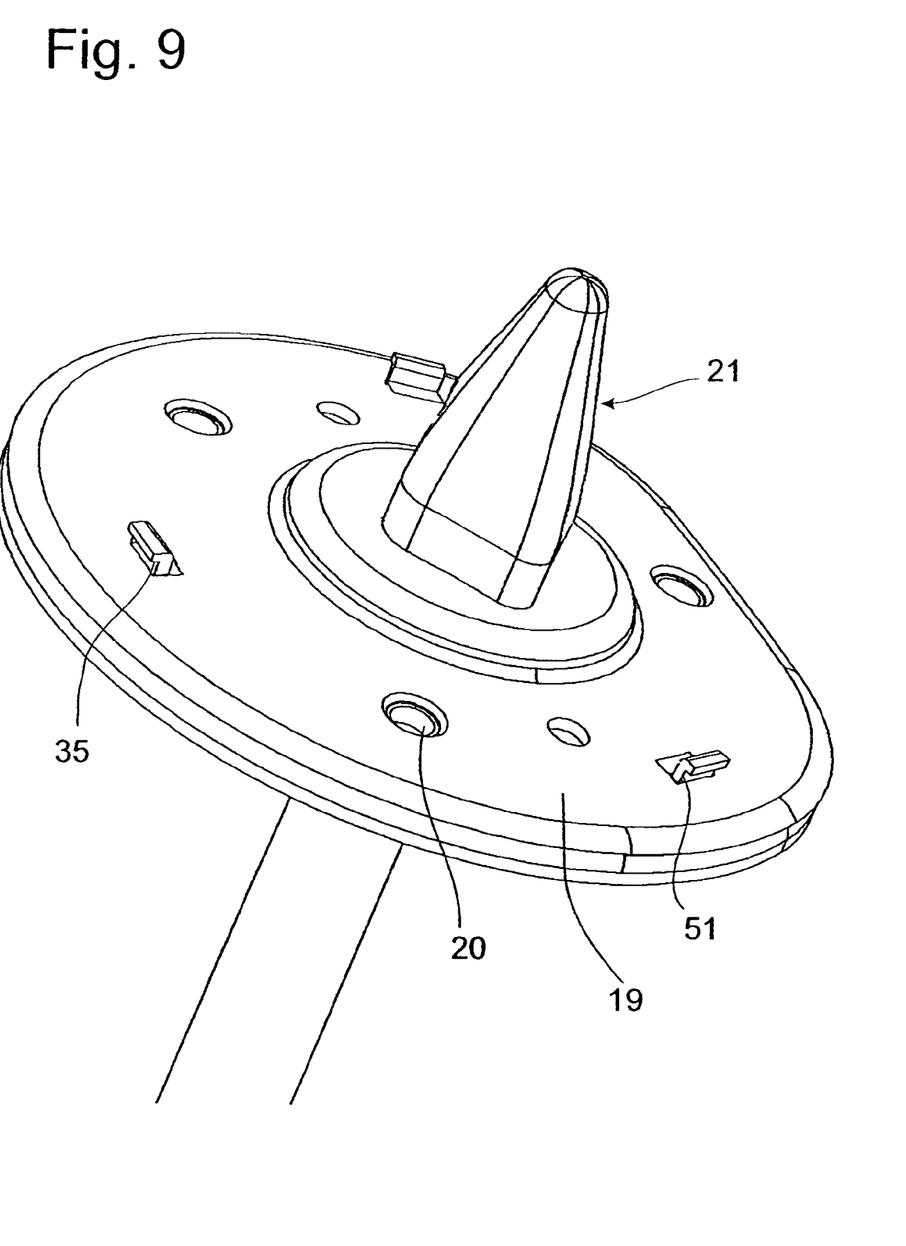
FIG. 9 shows the mount on the vibration damper side with the retaining means.
Figure 10:
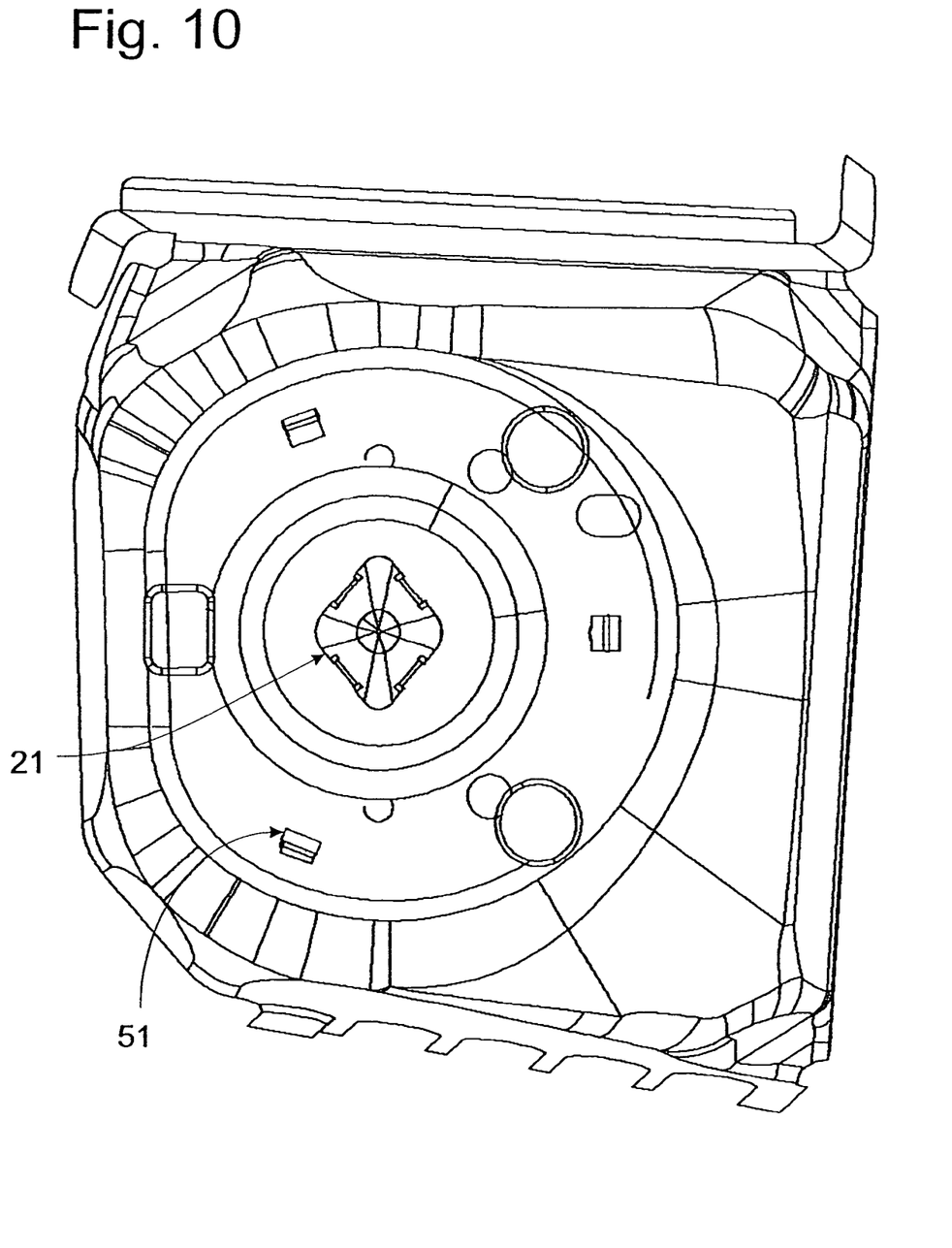
FIG. 10 shows a plan view of the mount according to FIG. 9.

FIGS. 9 and 10 are intended to show that the retaining means, i.e., the retaining surfaces 35, do not necessarily have to be provided on the bearing cap 21. As an alternative, retaining mean 35 can be realized on the carrier 19. The carrier 19 has radially elastic retaining arms 51, which also pass through the vehicle from underneath (see FIG. 10), so that the retaining surfaces 35 can again come to rest on the top surface of the vehicle.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A mount for mounting a vibration damper to a vehicle having a receiving opening and first connecting means for connecting the vibration damper to the vehicle, the mount comprising:
   a bearing cap engageable with a vibration damper and having at least one anti-twist surface which can be inserted into the receiving opening so as to align the bearing cap with respect to the vehicle;
   second connecting means coupled to the bearing cap and configured to cooperate with the first connecting means to fix the vibration damper to the vehicle after the anti-twist surface is inserted into the receiving opening, the anti-twist surface aligning the first connecting means with the second connecting means; and
   a retainer coupled to the bearing cap and configured to engage the vehicle to suspend the vibration damper from the vehicle until the vibration damper is fixed to the vehicle by the first and second connecting means, wherein the retainer acts independently of the first and second connecting means.

2. The mount of claim 1 wherein the retainer comprises retaining surfaces that are supported on a surface of the vehicle facing away from the vibration damper after the anti-twist surface is inserted into the receiving opening.

3. The mount of claim 1 wherein the retainer has at least one elastic tongue coupled to the cap and radially compressible while the anti-twist surface is being inserted into the receiving opening, the elastic tongue expanding radially after the anti-twist surface is inserted into the receiving opening.

4. The mount of claim 1 wherein the retainer is formed as one piece with the bearing cap.

5. The mount of claim 4 further comprising at least one positive connection fastening the bearing cap to the vibration damper.

6. The mount of claim 5 further comprising a carrier supporting the bearing cap, wherein the positive connection comprises at least one snap hook formed as one piece with the bearing cap and operable to couple the cap to the carrier.

7. The mount of claim 4 wherein the positive connection works independently of the at least one anti-twist surface.

8. The mount of claim 3 wherein the at least one elastic tongue is provided on a respective at least one anti-twist surface.

9. The mount of claim 4 comprising a plurality of anti-twist surfaces, the bearing cap having a maximum of one axis of symmetry with respect to the anti-twist surfaces.

10. The mount of claim 4 comprising a plurality of anti-twist surfaces, the bearing cap having two axes of symmetry relative to the anti-twist surfaces, the axes of symmetry extending perpendicular to a longitudinal axis of the vibration damper and having different lengths within the bearing cap.

11. The mount of claim 6 wherein the carrier has a cranked section extending toward the bearing cap and having a thickness configured to accommodate said at least one snap hook.

12. The mount of claim 11 wherein the bearing cap has a cup-shaped receptacle which receives the cranked section.

13. The mount of claim 1 further comprising a carrier supporting the bearing cap, the retainer being formed as one piece with the carrier.

* * * * *